(12) United States Patent
Morikawa et al.

(10) Patent No.: US 6,228,943 B1
(45) Date of Patent: May 8, 2001

(54) FLUORINE-CONTAINING ELASTOMER COMPOSITION

(75) Inventors: Tatsuya Morikawa; Mitsuru Kishine; Yoshihiro Shirai; Koji Matsumoto, all of Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/424,541

(22) PCT Filed: May 25, 1998

(86) PCT No.: PCT/JP98/02269

§ 371 Date: Nov. 24, 1999

§ 102(e) Date: Nov. 24, 1999

(87) PCT Pub. No.: WO98/54259

PCT Pub. Date: Dec. 3, 1998

(30) Foreign Application Priority Data

May 26, 1997 (JP) .................................................. 9-134780

(51) Int. Cl.[7] .............................. C08L 27/12; C08K 5/14; C08F 214/22
(52) U.S. Cl. ..................... 525/199; 525/276; 525/106; 524/463; 524/545; 524/504; 524/505; 524/520
(58) Field of Search ..................................... 525/199, 276, 525/104; 524/463, 545, 504, 505, 520

(56) References Cited

U.S. PATENT DOCUMENTS 5,008,340 * 4/1991 Guerra et al. ...................... 525/199
5,219,661 * 6/1993 Mascia et al. ...................... 525/199

FOREIGN PATENT DOCUMENTS

| 61-49327 | 7/1978 | (JP) . |
| 59-40066 | 3/1984 | (JP) . |
| 53-86786 | 10/1986 | (JP) . |
| 8-176388 | 7/1997 | (JP) . |

* cited by examiner

Primary Examiner—James J. Seidleck
Assistant Examiner—Olga Asinovsky
(74) Attorney, Agent, or Firm—Birch, Stewart, Kolasch & Birch, LLP

(57) ABSTRACT

A peroxide-curable fluorine-containing elastomer composition comprising 100 parts by weight of a fluorine-containing block polymer comprising at least one elastomeric polymer chain segment and at least one non-elastomeric polymer chain segment in which the content of said non-elastomeric polymer chain segment is less than 5% by weight, 0.05 to 10 parts by weight, preferably 0.3 to 5 parts by weight, more preferably 1 to 5 parts by weight, of an organic peroxide, and 0.1 to 10 parts by weight, preferably 0.5 to 8 parts by weight, more preferably 0.5 to 5 parts by weight, of a polyfunctional co-crosslinking agent. This composition has improved processing properties during curing and molding, while it has good tensile properties, heat resistance, oil resistance and high temperature sealing properties comparable to those of conventional peroxide-curable fluorine-containing elastomer compositions.

10 Claims, No Drawings

FLUORINE-CONTAINING ELASTOMER COMPOSITION

This application is the national phase under 35 U.S.C. § 371 of PCT International Application No. PCT/JP98/02269 which has an International filing date of May 25, 1998, which designated the United States of America.

FIELD OF THE INVENTION

The present invention relates to a fluorine-containing elastomer composition. In particular, the present invention relates to a peroxide-curable fluorine-containing elastomer composition, which has improved molding and processing properties, while it has good tensile properties, heat resistance, oil resistance and high temperature sealing properties comparable to those of known peroxide-curable fluorine-containing elastomer compositions.

BACKGROUND ART

Fluorine-containing elastomer compositions are used as materials of O-rings, gaskets, oil seals, diaphragms, hoses, rolls, seat members, etc. in various industrial fields such as automobile, ships, aircraft, hydraulic machines and general machine industries as well as environmental pollution-related fields. In particular, peroxide-curable fluorine-containing elastomers can be cured when fluororubbers have high fluorine concentrations, unlike the polyol curing or polyamine curing system. Furthermore, fluororubbers having iodine atoms at polymer chain ends have an advantage that they can be cured with peroxides without compounding metal oxides.

However, although peroxide-curable fluorine-containing elastomers have such good properties, they have low mold releasing properties and anticontamination of molds in the curing and molding steps. Thus, it is difficult to improve the working efficiency, and also the productivity tends to deteriorate due to the decrease of yields by cracking or breakage, when articles having complicated shapes are molded. Thus, external mold release agents or internal mold release agents are used to improve the mold releasing properties of fluorine-containing elastomers. However, when internal mold release agents are used, a problem arises, that the physical properties of cured products deteriorate. When external mold release agents are used, the effect to improve the mold releasing properties decreases as the number of molding cycles increases. Therefore, it is necessary to repeatedly apply the external mold release agents to a mold, and further the commercial value of products may decrease since marks of the external release-agents remain on the surfaces of molded articles.

In the case of peroxide curing, burrs formed in the course of compression molding, in particular, parts of burrs which are in contact with an air, are not sufficiently cured, and thus stain the surfaces of molds or molded articles.

Various improvements have been proposed to solve the above problems of peroxide-curable fluorine-containing elastomer compositions, but they have their own drawbacks.

For example, fluorine-containing block polymers, which are disclosed in JP-A-59-40066 relating to a sealing material resistant to lubricant oils and JP-B-61-49327 relating to a fluorine-containing segmented polymer, contain 5 wt. % or more of non-elastomeric polymer chain segments, and thus they have drawbacks that properties greatly deteriorate when they are formulated in the form of fluororubber compositions and cured.

A non-tacky fluororubber composition, which is prepared by a method disclosed in JP-A-8-176388 comprising mixing a fluororubber and a fluorine-containing block polymer, can achieve effects to some extent. However, it has a drawback that the content of a non-elastomeric component in the used fluororubbery thermoplastic elastomer is high, and thus it is not easy to mix the fluororubber and the fluorine-containing block polymer.

SUMMARY OF THE INVENTION

One object of the present invention is to solve the problems or drawbacks of the peroxide-curable fluorine-containing elastomer compositions disclosed in the above prior arts without deteriorating other good properties of the compositions.

According to the present invention, this object can be accomplished by a peroxide-curable fluorine-containing elastomer composition comprising (a) 100 parts by weight of a fluorine-containing block polymer comprising at least one elastomeric polymer chain segment and at least one non-elastomeric polymer chain segment in which the content of said non-elastomeric polymer chain segment is less than 5% by weight, (b) 0.05 to 10 parts by weight, preferably 0.3 to 5 parts by weight, more preferably 1 to 5 parts by weight, of an organic peroxide, and (c) 0.1 to 10 parts by weight, preferably 0.5 to 8 parts by weight, more preferably 0.5 to 5 parts by weight, of a polyfunctional co-crosslinking agent.

DETAILED DESCRIPTION OF THE INVENTION

The components contained in the composition of the present invention will be explained.

(a) Particularly preferred examples of the fluorine-containing block polymer used according to the-present invention are fluorine-containing block polymers each comprising a chain consisting of two or three-polymer chain segments, an iodine atom present at one end of the chain, and a residue that is present at the other end of the chain and derived from an iodide compound by removing at least one iodine atom therefrom, in which one of the polymer chain segments (when the chain consists of two polymer chain segments), or two of the polymer chain segments (when the chain consists three polymer chain segments) is or are one or two elastomeric polymer chain segment(s) having a molecular weight of 30,000 to 1,200,000 selected from the group consisting of:

(1) a vinylidene fluoride-(hexafluoropropylene or pentafluoropropylene)-tetrafluoroethylene polymer (molar ratio=45–90:5–50:0–35), in particular, a vinylidene fluoride-hexafluoropropylene-tetrafluoroethylene polymer (molar ratio= 40–90:10–50:0–30), (2) a perfluoro($C_1$–$C_3$ alkyl vinyl ether) (including one having a plurality of ether bonds)-tetrafluoroethylene-vinylidene fluoride polymer (molar ratio= 15–75:0–85:0–85), in particular, a perfluoro($C_1$–$C_3$ alkyl vinyl ether)-tetrafluoroethylene (molar ratio= 15–60:40–85), and (3) a tetrafluoroethylene-propylene-comonomer (e.g. ethylene, isobutyrene, acrylic acid and its esters, methacrylic acid and its esters, vinyl fluoride, hexafluoropropylene, vinylidene fluoride, chloroethyl vinyl ether, chlorotrifluoroethylene, or perfluoro ($C_1$–$C_3$ alkyl vinyl ether)) polymer (molar ratio=

40–70:30–60:0–20), and the remaining polymer chain segment is a non-elastomeric polymer chain segment selected from the group consisting of:
(4) a vinylidene fluorine-tetrafluoroethylene polymer (molar ratio=0–100:0–100), in particular, a vinylidene fluoride-tetrafluoroethylene polymer (molar ratio= 70–99:1–30), a tetrafluoroethylene homopolymer, or a vinylidene fluoride homopolymer,
(5) an ethylene-tetrafluoroethylene-(hexafluoropropylene, 3,3,3-trifluoropropylene-1, 2-trifluoromethyl-3,3,3-trifluoropropylene-1 or perfluoro ($C_1$–$C_3$ alkyl vinyl ether)) polymer (molar ratio= 40–60:60–40:0–30),
(6) a polymer of tetrafluoroethylene and a fluorine-containing vinyl compound of the formula:

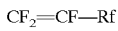

wherein Rf is a trifluoroalkyl group or a group of the formula: —$ORf_1$ in which $Rf_1$ is a $C_1$–$C_5$ perfluoroalkyl group (molar ratio=85–99.7:0.3–15),
(7) a vinylidene fluoride-tetrafluoroethylene-chlorotrifluoroethylene polymer (molar ratio= 50–99:0–30:1–20), and
(8) a vinylidene fluoride-tetrafluoroethylene-hexafluoropropylene polymer (molar ratio= 60–99:0–30:1–10), wherein a weight ratio of the elastomeric polymer chain segment(s) to the non-elastomeric polymer chain segment is 95–100:0–5 (both ends exclusive).

As the content of the non-elastomeric polymer chain segment may increase, the effects to solve the problems in curing and molding improves, while the properties of cured products worsen. Thus, the content of the non-elastomeric polymer chain segment is less than 5% by weight, preferably from 0.5 to less than 5% by weight, more preferably from 0.5 to 3% by weight.

A typical chemical structure of a fluorine-containing block polymer is represented by, for example, the following formula:

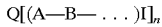

wherein Q is a residue of an iodide compound from which an iodine atom is removed, and A, B, . . . represent polymer chain segments, at least one of which is a fluorine-containing polymer segment, I is an iodine atom removed from the iodide compound, and n is the number of bonding sites of Q and essentially consists of a chain comprising at least two polymer chain segments, an iodine atom, and a residue derived from an iodide compound by removing at least one iodine atom therefrom.

Such at least two polymer chain segments are different from respective adjacent polymer chain segments (for example, segments having different structures or compositions of monomer units which constitute the segments), and at least one of them is a fluorine-containing polymer chain segment, and they comprise at least one hard segment and at least one soft segment. Preferably, at least one polymer chain segment has a molecular weight of at least 30,000, and one in a telomer range is excluded.

A residue derived from an iodide compound by removing at least one iodine atom therefrom may have a substituent, which is emanated from a monomer constituting the polymer chain segments or the iodide compound, when the iodide compound has a polymerizable double bond. In general, such a fluorine-containing block polymer contains 0.001 to 10% by weight of iodine atoms.

(b) An organic peroxide used according to the present invention may be any known organic peroxide which can liberate a peroxide radical at a curing temperature. Preferable examples of organic peroxides include di-tert.-butyl peroxide, dicumyl peroxide, 2,5-dimethyl-2,5-di(benzoylperoxy)hexane, 2,5-dimethyl-2,5-di(tert.-butylperoxy)hexane, etc.

The content of an organic peroxide is usually from 0.05 to 10 parts by weight, preferably from 0.3 to 5 parts by weight, more preferably from 1 to 5 parts by weight, per 100 parts by weight of the fluorine-containing block polymer (a).

When the content of an organic peroxide is less than 0.05 part by weight, the fluorine-containing block polymer (a) may not sufficiently be cured. When the content of an organic peroxide exceeds 10 parts by weight, the properties of cured products may deteriorate.

(c) A polyfunctional co-crosslinking agent used according to the present invention may be any known polyfunctional co-crosslinking agent which is used in combination with an organic peroxide in the peroxide-curing. Preferred examples of co-crosslinking agents include triallyl cyanurate, trimetharyl isocyanurate, triallyl isocyanurate, triacrylformal, triallyl trimellitate, N,N'-m-phenylenebismaleimide, diallyl phthalate, tatrallyl terephthalamide, tris(diallylamine)-S-triazine, triallyl phosphite, N,N-diallylacrylamide, etc.

The content of a polyfunctional co-crosslinking agent is usually from 0.1 to 10 parts by weight, preferably from 0.5 to 8 parts by weight, more preferably from 0.5 to 5 parts by weight, per 100 parts by weight of the fluorine-containing block polymer (a).

When the content of a polyfunctional co-crosslinking agent is less than 0.1 part by weight, the fluorine-containing block polymer (a) may not sufficiently be cured. When the content of a polyfunctional co-crosslinking agent exceeds 10 parts by weight, the elongation of cured products may decrease.

The fluorine-containing elastomer composition of the present invention may optionally contain conventional additives which are compounded in fluorine-containing elastomer compositions, for example, fillers, processing aids, plasticizers, colorants, etc. It is possible to compound one or more conventional curing agents and curing accelerators, which are di different from the above components (b) and (c). Furthermore, known fluororubbers may be compounded in the fluorine-containing elastomer composition of the present invention insofar as the effects of the present invention are not impaired.

The fluorine-containing elastomer composition of the present invention can be prepared by mixing the above components with any processing apparatus for rubbers, for example, open rolls, Banbury mixers, kneaders, etc.

The fluorine-containing elastomer composition of the present invention can be cured under conventional curing conditions which are employed to cure rubbers. For example, the composition is charged in a mold and press cured under pressure at a temperature of 120 to 200° C. for 1 to 60 minutes, and then oven cured in a furnace at a temperature of 120 to 250° C. for 0 to 48 hours. Thus, a cured (vulcanized) rubber is obtained.

EXAMPLES

Now, the present invention will be explained in detail by the following examples, which do not limit the scope of the invention in any way.

The abbreviations used in the examples have the following meanings:

VdF: Vinylidene fluoride
HFP: Hexafluoropropylene

TFE: Tetrafluoroethylene
APS: Ammonium persulfate

Synthesis of Fluiorine-Containing Block Polymers
1) Synthesis of a fluorine-containing block polymer used in Comparative Example 1

Pure water (3,000 ml) and ammonium perfluorooctanoate (6 g) were charged in a 6,000 ml pressure reactor. After thoroughly replacing the internal atmosphere of the reactor with pure nitrogen gas, a mixed gas of TFE, VdF and HFP (molar ratio of 11:20:69) was injected at 80° C. while stirring to pressurize the reactor to 15 kgf/cm$^2$G. Then, a 0.4 wt. % aqueous solution of APS (10 ml) was charged under pressure. As soon as the APS solution was added, a polymerization reaction was initiated, and the pressure dropped. When the pressure dropped to 14 kgf/cm$^2$G, a mixed gas of TFE, VdF and HFP (molar ratio of 20:50:30) (supplement charge gas) was injected to repressurize the reactor to 15 kgf/cm$^2$G. Thereafter, the polymerization was continued while maintaining the internal pressure in the range between 14 and 15 kgf/cm$^2$G by the above procedures.

In the course of the polymerization, when the total amount of the supplement charge gas reached 25 g, ICF$_2$CF$_2$CF$_2$CF$_2$I (4.6 g) was charged, and the 0.4 wt. % aqueous solution of APS (each 10 ml) was injected every 3 hours from the initiation of the polymerization.

When the total amount of the supplement charge gas reached 1,000 g, the temperature was lowered and the pressure was released to terminate the polymerization. The polymerization time was 18 hours.

The solid content of the obtained dispersion was 24.8% by weight.

The dispersion was coagulated with a line mixer exerting strong shear force, and the coagulated material was washed with water and dried. Thus, a fluorine-containing elastomer having a Mooney viscosity ML$_{1+10}$100° C. of 50 (990 g) was obtained.

2) Synthesis of fluorine-containing block polymer (i)

After the dispersion was prepared in the same manner as in the above synthesis 1), the internal atmosphere of the reactor was thoroughly replaced with pure nitrogen gas. Then, the reactor was pressurized to 1 kgf/cm$^2$G with TFE, and a 0.4 wt. % aqueous solution of APS (10 ml) was injected. As soon as the APS solution was added, a polymerization reaction was initiated, and the pressure dropped. When the pressure dropped to 0 kgf/cm$^2$G, TFE was injected to repressurize the reactor to 1 kgf/cm$^2$G. When the supplemented amount of TFE reached 25 g in total and the pressure was increased to 1 kgf/cm$^2$G, which was the same as the pressure at the time of polymerization initiation, the temperature was lowered and the pressure was released to terminate the polymerization. The polymerization time was 2 hours and 30 minutes.

The solid content of the obtained dispersion was 25.5% by weight.

The dispersion was coagulated, washed with and dried in the same manner as in the synthesis 1). The obtained fluorine-containing elastomer had a Mooney viscosity ML$_{1+10}$100° C. of 80, and the yield was 1,020 g.

The content of the PTFE segment corresponded to 2.5% by weight (calculated from the charged amount).

3) Synthesis of fluorine-containing block polymer (ii)

After the dispersion was prepared in the same manner as in the above synthesis 1), the internal atmosphere of the reactor was thoroughly replaced with pure nitrogengas. Then, the reactor was pressurized to 15 kgf/cm$^2$G with VdF, and a 0.4 wt. % aqueous solution of APS (10 ml) was injected. As soon as the APS solution was added, a polymerization reaction was initiated, and the pressure dropped. When the pressure dropped to 14 kgf/cm$^2$G, VdF was injected to repressurize the reactor to 15 kgf/cm$^2$G. When the supplemented amount of VdF-reached 45 g, the temperature was lowered and the pressure was released to terminate the polymerization. The polymerization time was 1 hour and 10 minutes.

The solid content of the obtained dispersion was 25.8% by weight.

The dispersion was coagulated, washed with and dried in the same manner as in the synthesis 1). The obtained fluorine-containing elastomer had a Mooney viscosity ML$_{1+10}$100° C. of 95, and the yield of the rubber was 1,020 g.

The content of the PVdF segment corresponded to 4.5% by weight.

4) Synthesis of fluorine-containing block polymer (iii) used in Comparative Example 2

After the dispersion was prepared in the same manner as in the above synthesis 1), the internal atmosphere of the reactor was thoroughly replaced with pure nitrogen gas. Then, the reactor was pressurized to 1 kgf/cm$^2$G with TFE, and a 0.4 wt. % aqueous solution of APS (10 ml) was injected. As soon as the APS solution was added, a polymerization reaction was initiated, and the pressure dropped. When the-pressure dropped to 0 kgf/cm$^2$G, TFE was injected to repressurize the reactor to 1 kgf/cm$^2$G. The pressurizing and supplemental charge of TFE were repeated. When the supplemented amount of TFE reached 110 g in total, the temperature was lowered and the pressure was released to terminate the polymerization. The polymerization time was 8 hours and 30 minutes. In this case, a 0.4 wt. % aqueous solution of APS (each 10 ml) was injected after 3 hours and 6 hours from the initiation of the polymerization.

The solid content of the obtained dispersion was 27.0% by weight.

The dispersion was coagulated, washed with and dried in the same manner as in the synthesis 1). The obtained fluorine-containing elastomer had a Mooney viscosity ML$_{1+10}$100° C. of 104, and the yield was 1,101 g.

The content of the PTFE segment corresponded to 10.0% by weight.

5) Synthesis of fluorine-containing block polymer used in Comparative Example 3

Pure water (3,000 ml) and ammonium perfluorooctanoate (6 g) were charged in a 6,000 ml pressure reactor. After thoroughly replacing the internal atmosphere of the reactor with pure nitrogen gas, a mixed gas of VdF and HFP (molar ratio of 50:50) was injected to pressurize the reactor to 15 kgf/cm$^2$G. Then, a 0.4 wt. % aqueous solution of APS (10 ml) was charged under pressure. As soon as the APS solution was added, a polymerization reaction was initiated, and the pressure dropped. When the pressure dropped to 14 kgf/cm$^2$G, a mixed gas of VdF and HFP (molar ratio of 78:22) (supplement charge gas) was injected to repressurize the reactor to 15 kgf/cm$^2$G. Thereafter, the polymerization was continued while maintaining the internal pressure in the range between 14 and 15 kgf/cm$^2$G by the above procedures.

In the course of the polymerization, when the total amount of the supplement charge gas reached 25 g, ICF$_2$CF$_2$CF$_2$CF$_2$I (4.6 g) was charged, and the 0.4 wt. % aqueous solution of APS (each 10 ml) was injected every. 3 hours from-the initiation of the polymerization.

When the total amount of the supplement charge gas reached 1,000 g, the temperature was lowered and the pressure was released to-terminate the polymerization. The polymerization time was 28 hour.

The solid content of the obtained dispersion was 24.7% by weight.

The dispersion was coagulated with a line mixer exerting strong shear force, and the coagulated material was washed with water and dried. Thus, a fluorine-containing elastomer having a Mooney viscosity $ML_{1+10}100°$ C. of 66 (993 g) was obtained.

6) Synthesis of fluorine-containing block polymer (iv)

After the dispersion was prepared in the same manner as in the above synthesis 5), the internal atmosphere of the reactor was thoroughly replaced with pure nitrogen gas. Then, the reactor was pressurized to 1 kgf/cm²G with TFE, and a 0.4 wt. % aqueous solution of APS (10 ml) was injected. As soon as the APS solution was added, a polymerization reaction was initiated, and the pressure dropped. When the pressure dropped to 0 kgf/cm²G, TFE was injected to repressurize the reactor to 1 kgf/cm²G. When the supplemented amount of TFE reached 45 g in total and the pressure was increased to 1 kgf/cm²G, which was the same as the pressure at the time of polymerization initiation, the temperature was lowered and the pressure was released to terminate the polymerization. The polymerization time was 5 hours.

The solid content of the obtained dispersion was 25.7% by weight.

The dispersion was coagulated, washed with and dried in the same manner as in the synthesis 5). The obtained fluorine-containing elastomer had a Mooney viscosity $ML_{1+10}100°$ C. of 86, and the yield of the rubber was 1,039 g.

The content of the PTFE segment corresponded to 4.5% by weight.

Examples 1–3 and Comparative Examples 1–3

The components shown in Table 1 were successively added and well kneaded on rubber rolls, and the compound was kept standing on the rolls overnight to age it. Then, the compound was again kneaded on the rolls, and press cured and oven cured under the conditions specified in Table 1. Thus, a sheet-form cured rubber and O-rings were obtained.

Physical properties and molding properties in a mold of the obtained sheet-form cured rubber and O-rings were measured or evaluated as follows:

a) The hardness of a cured material was measured according to JIS K 6253, Type A, while 100% tensile stress, tensile strength and elongation were measured according to JIS K 6301.

b) Compression set was evaluated using P-24 dynamic O-ring, which is defined in JIS B 2401, according to JIS K 6301 under the conditions-of 200° C. ×700 hours and 25% compression.

c) Molding properties in a mold was evaluated with respect to the following two items by press curing a composition three shots (one shot: 170° C., 4 minutes) in armold for P-8 dynamic O-rings (65 pieces) which is defined in JIS B 2401.

When the mold release property was evaluated, a rubber with which components were compounded, was kept standing at 40° C. for 7 days, and then press cured. This assumed that triallyl isocyanurate and 2,5-dimethyl-2,5-di(tert.-butylperoxy)hexane bleed on the surface of the compound, and thus the compound has low molding properties in summertime. The used mold was made of iron the surface of which is plated with hard chromium.

Evaluated items:

1. The number of O-rings (total of three shots) in which the body of the O-ring adhered to the mold, and a burr was broken at a pinch-off part, when the cured products were removed from the mold.

2. Whether a part of a burr contaminates a mold when the cured products are removed from the mold.

TABLE 1

|  | Ex. 1 | Ex. 2 | C. Ex. 1 | C. Ex. 2 | Ex. 3 | Ex. 4 |
|---|---|---|---|---|---|---|
| Component (wt. parts) | | | | | | |
| Fluororubber | F-cont. block polymer (i) 100 | F-cont. block polymer (ii) 100 | Polymer obtained in synthesis 1) 100 | F-cont. block polymer (iii) 100 | F-cont. block polymer (iv) 100 | Polymer obtained in synthesis 5) 100 |
| MT carbon black | 20 | 20 | 20 | 20 | 20 | 20 |
| Triallylisocyanurate | 4 | 4 | 4 | 4 | 4 | 4 |
| 2,5-Dimethyl-2,5-di(tert.-butyloxy)-hexane | 1.5 | 1.5 | 1.5 | 1.5 | 1.5 | 1.5 |
| Curing conditions | | | | | | |
| Press cure | 160° C. × 10 min. | 160° C. × 10 min. | 160° C. × 10 min. | 160° C. × 10 min. | 160° C. × 10 min. | 160° C. × 10 min. |
| Oven cure | 18.0° C. × 4 hrs. | 180° C. × 4 hrs. | 180° C. × 4 hrs. | 180° C. × 4 hrs. | 180° C. × 4 hrs. | 180° C. × 4 hrs. |
| Properties of cured product | | | | | | |
| 100% Tensile stress (kgf/cm²) | 45 | 52 | 38 | 147 | 41 | 23 |
| Tensile strength (kgf/cm²) | 274 | 269 | 251 | 303 | 269 | 239 |
| Elongation (%) | 310 | 310 | 340 | 295 | 460 | 470 |
| Hardness | 74 | 74 | 72 | 86 | 74 | 67 |
| Compression set (%) | 23 | 23 | 23 | 26 | 26 | 27 |

TABLE 1-continued

|  | Ex. 1 | Ex. 2 | C. Ex. 1 | C. Ex. 2 | Ex. 3 | Ex. 4 |
| --- | --- | --- | --- | --- | --- | --- |
| Molding properties in mold | | | | | | |
| Number of O-rings remained on mold | 0 | 10 | 50 | 0 | 0 | 1 |
| Contamination of mold without a part of burr | No | No | No | No | No | Yes |

In comparison with the known peroxide-curable fluororubber of Comparative Example 1 (a vinylidene fluoride-tetrafluoroethylene-hexafluoropropylene elastomer), the fluorine-containing block polymers of Examples 1 and 2 (a vinylidene fluoride-tetrafluoroethylene-hexafluoropropylene elastomer containing 2.5% by weight of a PTFE segment and 4.5% by weight of a PVdF segment, respectively) reduced the number of O-rings remained on a mold, and caused less contamination with a part of a burr. Thus, the block polymers of Examples 1 and 2 had better molding properties than the fluororubber of Comparative Example 1.

The fluorine-containing block polymer of Comparative Example 2 had a content of a PTFE segment of 10% by weight. Thus, it had good molding properties, but the hardness of a cured product increased, and the compression set was not good, because of the high content of the PTFE segment.

In comparison with the known peroxide-curable fluororubber of Comparative Example 3 (a vinylidene fluoride-hexafluoropropylene elastomer), the fluorine-containing block polymer of Example 3 (a vinylidene fluoride-hexafluoropropylene elastomer containing 4.5% by weight of a PTFE segment) caused less contamination with a part of a burr. Thus, the block polymer of Example 3 had better molding properties than the fluororubber of Comparative Example 3.

What is claimed is:

1. A peroxide-curable fluorine-containing elastomer composition comprising
   (a) 100 parts by weight of a fluorine-containing block polymer comprising at least one elastomeric polymer chain segment and at least one non-elastomeric polymer chain segment in which the content of said non-elastomeric polymer chain segment is less than 5% by weight,
   (b) 0.05 to 10 parts by weight of an organic peroxide, and
   (c) 0.1 to 10 parts by weight of a polyfunctional co-crosslinking agent.

2. The peroxide-curable fluorine-containing elastomer composition according to claim 1, wherein said elastomeric polymer segment of said fluorine-containing block polymer is at least one polymer segment selected from the group consisting of a vinylidene fluoride-tetrafluoroethylene-hexafluoropropylene polymer, a vinylidene fluoride-hexafluoropropylene polymer and a tetrafluoroethylene-perfluoroalkyl vinyl ether polymer, and said non-elastomeric polymer segment is polytetrafluoroethylene or polyvinylidene fluoride.

3. The peroxide-curable fluorine-containing elastomer composition according to claim 1, wherein the content of said non-elastomeric polymer chain segment is from 0.5 to 3% by weight.

4. The peroxide-curable fluorine-containing elastomer composition according to claim 1, wherein the organic peroxide is present in an amount of from 1 to 5 parts by weight based on 100 parts by weight of the fluorine-containing block polymer (a).

5. The peroxide-curable fluorine-containing elastomer composition according to claim 1, wherein the polyfunctional co-crosslinking agent is present in an amount of from 0.5 to 5 parts by weight based on 100 parts by weight of the fluorine-containing block polymer (a).

6. The peroxide-curable fluorine-containing elastomer composition according to claim 1, wherein the organic peroxide is selected from the group consisting of di-tert.-butyl peroxide, dicumyl peroxide, 2,5-dimethyl-2,5-di(benzolyperoxy)hexane, and 2,5-dimethyl-2,5-di(tert.-butylperoxy)hexane.

7. The peroxide-curable fluorine-containing elastomer composition according to claim 2, wherein the organic peroxide is selected from the group consisting of di-tert.-butyl peroxide, dicumyl peroxide, 2,5-dimethyl-2,5-di(benzolyperoxy)hexane, and 2,5-dimethyl-2,5-di(tert.-butylperoxy)hexane.

8. The peroxide-curable fluorine-containing elastomer composition according to claim 1, wherein the polyfunctional co-crosslinking agent is selected from the group consisting of triallyl cyanurate, trimetharyl isocyanurate, triallyl isocyanurate, triacrylformal, triallyl trimellitate, N,N'-m-phenylenebismaleimide, diallyl phthalate, tetrallyl terephthalamide, tris(diallylamine)-S-triazine, triallyl phosphite, and N,N-diallylacrylamide.

9. The peroxide-curable fluorine-containing elastomer composition according to claim 2, wherein the polyfunctional co-crosslinking agent is selected from the group consisting of triallyl cyanurate, trimetharyl isocyanurate, triallyl isocyanurate, triacrylformal, triallyl trimellitate, N,N'-m-phenylenebismaleimide, diallyl phthalate, tetrallyl terephthalamide, tris(diallylamine)-S-triazine, triallyl phosphite, and N,N-diallylacrylamide.

10. The peroxide-curable fluorine-containing elastomer composition according to claim 7, wherein the polyfunctional co-crosslinking agent is selected from the group consisting of triallyl cyanurate, trimetharyl isocyanurate, triallyl isocyanurate, triacrylformal, triallyl trimellitate, N,N'-m-phenylenebismaleimide, diallyl phthalate, tetrallyl terephthalamide, tris(diallylamine)-S-triazine, triallyl phosphite, and N,N-diallylacrylamide.

* * * * *